N.F. Weston,
Tapping Pipes.
Nº 66,659. Patented July 9, 1867.
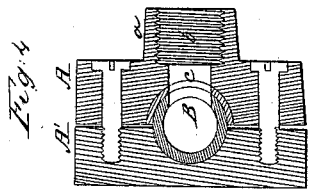
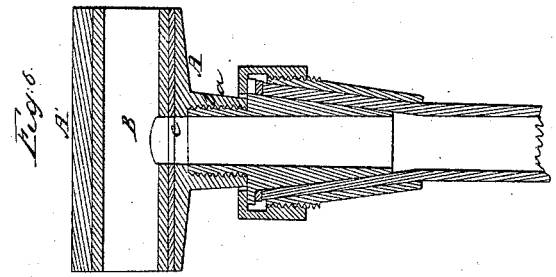
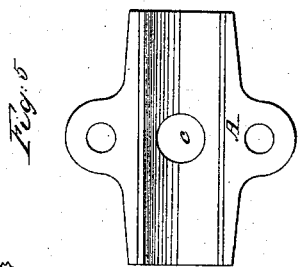
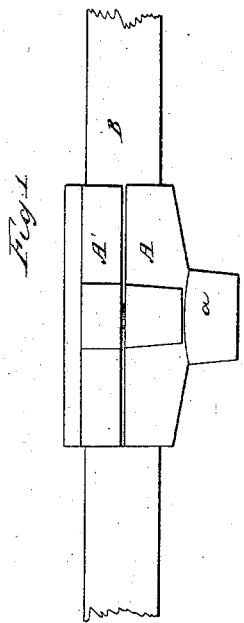
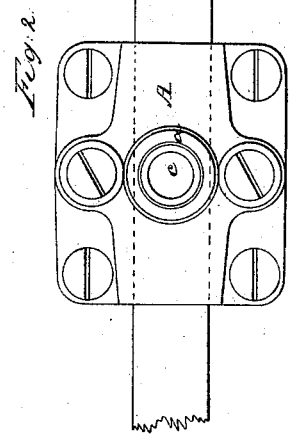
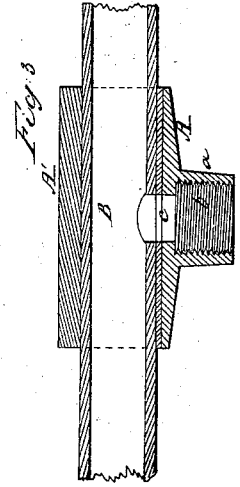
Witnesses
C. W. Baldwin
C. Lloyd Turner
Inventor.
Nathan F. Weston
by his Attorney
Frederick Curtis

United States Patent Office.

NATHAN FOSTER WESTON, OF BOSTON, MASSACHUSETTS.

Letters Patent No. 66,659, dated July 9, 1867.

IMPROVEMENT IN COUPLING FAUCETS TO PIPES.

*The Schedule referred to in these Letters Patent and making part of the same.*

TO ALL WHOM IT MAY CONCERN:

Be it known that I, NATHAN F. WESTON, of Boston, in the county of Suffolk, and State of Massachusetts, have invented a new and useful Mode of Applying Faucets, etc., to a Pipe; and do hereby declare the following to be a full, clear, and exact description thereof; reference being had to the accompanying drawings, making part of this specification, and in which—

Figure 1 is a top view.
Figure 2, a front elevation.
Figure 3, a horizontal section; and
Figure 4 a transverse section of the said invention.
Figure 5 is an inner side view of the cap-plate, to be described.
Figure 6 shows a modified application of my invention.

The object of this invention is to enable a faucet or a T-joint or branch-pipe to be applied to a pipe or tube without the aid of solder and without removing the pipe from its place.

The invention consists of two plates so formed and applied as to circumscribe and clasp the pipe firmly between them, a boss or offset, having a female screw cut within it for the reception of the faucet or of the T being formed upon one of the two plates, a hole corresponding in area and position to that of the faucet being cut in the pipe to open communication between the two.

In the drawings above referred to as illustrating my invention, A A' denote two metallic plates grooved for the reception of the pipe, which is shown at B, the inner plate A', which in practice would generally be applied to the wall of an apartment, having ears formed upon it for this purpose. The outer or cap-plate A is screwed to the plate A', as represented, and the two, after enclosing the pipe between them, are clamped tightly together. The said cap-plate A has an offset, $a$, formed upon it, this offset having a female screw, $b$, cut through it and the plate into which the faucet is screwed in the usual manner. A packing of rubber or other suitable material is interposed between the cap-plate A and the pipe B, immediately about the female screw $b$, a hole or passage, $c$, subsequently being cut through this packing and the pipe to open communication between it and the faucet, and completing the connection of the two. Fig. 6 of the drawings represents the application of a T or branch-pipe to the pipe B by means of the clamp-plates before described, which will readily explain itself to persons skilled in the art to which my invention appertains.

Several important advantages result from the application of my invention, one being the fact that no solder is employed or required, thus enabling any person at any time to apply a faucet or a T to a pipe, it being well known that the ordinary mode of applying a faucet being attended with the expenditure of much time and labor, as well as expense, and requiring an experienced plumber to accomplish it.

Another advantage in my invention is that the pipe to which the faucet is to be applied need not be removed from its original position, thus doing away with the necessity, now unavoidable, of taking down a considerable portion of the said pipe.

To these advantages is added the by no means insignificant fact that a faucet may be applied by my method at far less expense and in a very short space of time, or a small fraction of the time now employed in affixing the faucet. The joint thus formed is also much more durable and less liable to fracture than the old one. Other practical advantages of my invention will recommend themselves to plumbers or gas-fitters, to whom this specification is chiefly addressed.

I claim the mode, substantially as above described, of applying a faucet or T to a pipe, by which the use of soldering is dispensed with and other advantages gained, essentially as explained.

NATHAN FOSTER WESTON.

Witnesses:
CHAS. H. GRIFFIN,
C. LLOYD TURNER.